(12) United States Patent
Watts

(10) Patent No.: US 7,255,056 B2
(45) Date of Patent: Aug. 14, 2007

(54) STABLE, HIGH-SPEED MARINE VESSEL

(75) Inventor: Michael A. Watts, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/072,488

(22) Filed: Mar. 4, 2005

(65) Prior Publication Data
US 2006/0196403 A1 Sep. 7, 2006

(51) Int. Cl.
*B63B 1/16* (2006.01)
*B63B 1/00* (2006.01)

(52) U.S. Cl. .................. 114/272; 114/61.1

(58) Field of Classification Search ........... 114/272, 114/273, 61.1
See application file for complete search history.

(56) References Cited

U.S. PATENT DOCUMENTS

| | | |
|---|---|---|
| 3,463,108 A | 8/1969 | Neumeier |
| 4,763,596 A * | 8/1988 | Yoshida .............. 114/256 |
| 5,813,358 A * | 9/1998 | Roccotelli ............. 114/272 |
| 6,439,148 B1 | 8/2002 | Lang |
| 6,497,189 B1 * | 12/2002 | Vollmerhausen ......... 114/67 A |
| 6,581,536 B1 | 6/2003 | Belloso |

FOREIGN PATENT DOCUMENTS

| | | |
|---|---|---|
| EP | 345406 A1 * | 12/1989 |
| FR | 2534874 | 4/1984 |
| FR | 2567095 | 1/1986 |
| GB | 271729 | 6/1927 |
| WO | 93/21060 | 10/1993 |

* cited by examiner

*Primary Examiner*—Jesús D. Sotelo
(74) *Attorney, Agent, or Firm*—Demont & Breyer LLC

(57) ABSTRACT

A marine vessel that possesses a capability for greater speed than most static-lift craft and is more stable than most dynamic-lift craft is disclosed. The vessel incorporates elements from both SWATH craft and WIG craft. In the illustrative embodiment, the marine vessel includes an upper hull that is disposed above the water line, a dynamic-lift-providing element that is disposed above the water line, a propulsion system that is disposed above the water line, a static-lift-providing element that is disposed below the water line, a propulsion system that is disposed below the water line; and struts that couple the static-lift-providing element to the upper hull and that raise the upper hull some distance above the water line.

15 Claims, 1 Drawing Sheet

STABLE, HIGH-SPEED MARINE VESSEL

FIELD OF THE INVENTION

The present invention relates generally to marine vessels, and more particularly to marine vessels that are stable at relatively high speeds.

BACKGROUND OF THE INVENTION

Marine vehicles can be categorized as either static-lift (displacement) craft or dynamic-lift craft. Static-lift craft tend to be more stable than dynamic-lift craft, but slower than them.

For a static-lift craft, buoyant force is generated by the displacement of a portion of the supporting medium, which is water for the case of a marine vessel. Dynamic-lift craft derive their lift from the movement of a foil (e.g., wing, etc.) through air, water, or both.

Static lift is more economical than dynamic lift from a production-of-lift point of view. But a static-lift craft becomes relatively inefficient when it is required to move through the surrounding medium (water). Due to the nature of displacement buoyancy, static-lift craft develop a substantial amount of dynamic drag when in motion. Examples of static-lift craft include mono-hull ships, catamarans, and SWATH (small waterplane area twin hull) craft.

Dynamic-lift vessels are typically faster than static-lift craft because they develop less dynamic drag. A principle shortcoming of the dynamic-lift craft is that it requires forward motion of some finite velocity to generate lift. As a result, this type of craft cannot operate, as such, at relatively slower speeds. Examples of dynamic-lift craft include hydrofoil ships, WIG (wing-in-ground) effect craft, seaplanes, and ACV (air cushion vehicles).

SUMMARY

The present invention provides a marine vessel that provides a greater amount of speed than most static-lift vessels yet also provides a higher level of stability than most dynamic-lift craft.

The illustrative embodiment of the present invention is a marine vessel that employs both static lift and dynamic lift. In the illustrative embodiment, the marine vessel includes:
- an upper hull disposed above the water line;
- a dynamic-lift-providing element disposed above the water line;
- a propulsion system disposed above the water line;
- a static-lift-providing element disposed below the water line;
- a propulsion system disposed below the water line; and
- struts that couple the static-lift-providing element to the upper hull and that raise the upper hull some distance above the water line.

In the illustrative embodiment, the dynamic-lift-providing element is a wing and the static-lift-providing element are two lower hulls or pontoons.

Those skilled in the art will recognize that the illustrative embodiment possesses some elements of both SWATH craft and WIG craft. In particular, the vessel includes the submerged lower hulls and extended struts characteristic of a SWATH craft. The lower hulls provide "lift" via displacement. Because they are submerged, the lower hulls do not follow surface wave motion. By way of analogy, consider the relatively common experience of "ducking" under a large wave, versus remaining at the water's surface, while swimming in the ocean. The affect on the stability of a person or a vessel is the same. That is, a submerged body is affected far less by wave motion than a body that is afloat at the water's surface. In other words, stability is substantially increased by submerging.

In the illustrative embodiment, the vessel will remain stable at speed as long as its upper hull does not contact the water. Once it does, the vessel follows wave motion. This is a purpose of the struts; to raise the upper hull above the water line. The larger the distance between the lower hull(s) and the upper hull (i.e., the longer the struts), the higher the sea state in which the vessel can maintain stable operation. Furthermore, the struts have a small waterplane area (i.e., the cross sectional area at the waterline). This results in longer natural periods and reduced buoyancy-force changes. Hull fins (i.e., conards, stabilizers) provide additional motion damping and dynamic stabilization when underway. Collectively, these SWATH-based attributes provide a high degree of stability to a marine vessel in accordance with the illustrative embodiment.

But the vessel also possesses the wings and the above-the-water-line propulsion unit (e.g., turbine, propellers, etc.) characteristic of a WIG craft. In the illustrative embodiment, the dynamic lift provided by the wings supplements the lift—buoyancy—provided by the lower hulls. This reduces the displacement requirement of the lower hulls. As a consequence, the lower hulls can be made smaller than would otherwise be the case, which reduces drag, thereby increasing speed.

This approach—combining SWATH and WIG characteristics—provides a capability to tailor the performance characteristics of a vessel to a particular application.

If, for example, the vessel is to be used in relatively calm waters, the stability benefits of the SWATH sea frame are of reduced importance. As a consequence, the vessel can be designed for relatively higher speeds by de-emphasizing SWATH characteristics in favor of WIG characteristics. In particular, in some embodiments, the vessel is designed so that a relatively greater proportion of the required lift is provided by the wings, etc., and a relatively lesser proportion is provided by the lower hulls. The size of the lower hulls can, therefore, be reduced. This reduces drag and increases speed. As a practical matter, the lower hulls must have a certain minimum size, at least in embodiments in which they are to provide all lift for the vessel when it is stationary. To this end, the vessel contains buoyancy tanks by which the ballast of vessel is adjusted. Thus, in calm water, the tanks can be at least partially flooded, decreasing the ballast that is provided by the lower hulls.

Conversely, if the vessel is to be used in very high sea states, then the stability benefits of the SWATH sea frame are of increased importance. As a consequence, the vessel can be designed for relatively higher stability by emphasizing SWATH characteristics and deemphasizing WIG characteristics. In particular, in some embodiments, the vessel is designed so that a relatively greater proportion of the required lift is provided by the lower hulls and a relatively lesser proportion is provided by above-the-water-line lift-providing elements (e.g., wings, etc.). The struts can be lengthened to increase the distance between the lower hulls and the upper hull, thereby enabling operation in greater sea states.

DETAILED DESCRIPTION

Figure 1:
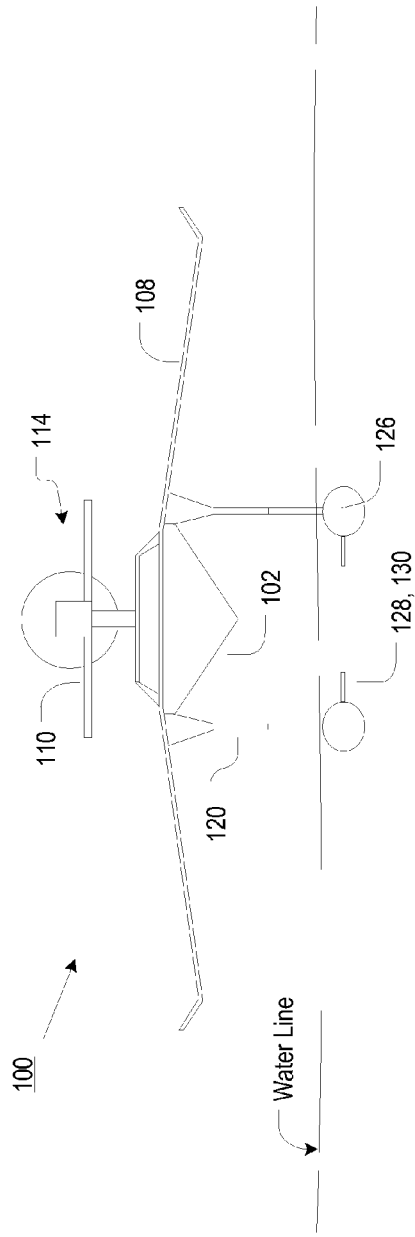
FIG. 1 depicts front view of a marine vessel in accordance with the illustrative embodiment of the present invention.
Figure 2:
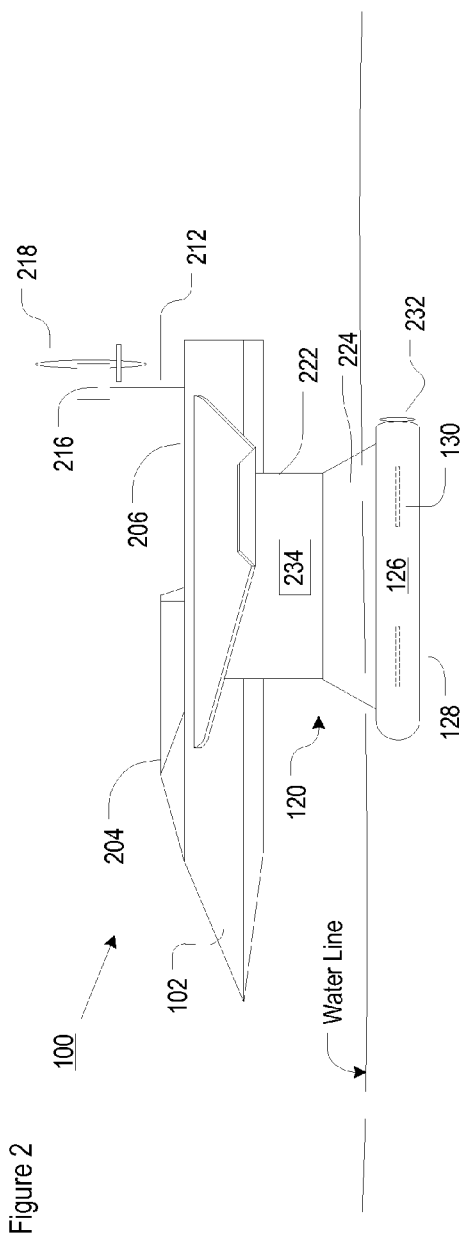
FIG. 2 depicts a side view of the marine vessel of FIG. 1.

FIG. 1 depicts a front view and FIG. 2 depicts a side view of marine vessel 100 in accordance with the illustrative embodiment of the present invention. Referring now to both Figures, vessel 100 includes upper hull 102, wings 108, struts 120, and lower hulls 126, interrelated as shown.

Upper hull 102 includes cockpit or pilot house 204 and deck 206. In some embodiments, deck 206 is enclosed (not depicted) to provide a protected storage area. Upper hull 102 is advantageously configured with stealth surfaces (e.g., angled surfaces, etc.) and materials to reduce its signatures (e.g., radar, infrared, etc.).

Wings 108 are disposed amidship; they depend from upper hull 102. As described in further detail later in this specification, wings provide lift (i.e., dynamic lift), when vessel is underway at sufficient speed. In the illustrative embodiment, the wings are not designed for flight; they simply supplement the lift (i.e., buoyancy) provided by lower hulls 106.

Tail fins 110 depend from riser 212 at the aft end of vessel 100. The tail fins serve primarily as a control/stability element.

Above-the-water propulsion unit 114 depends from riser 212. In the illustrative embodiment, propulsion unit 114 includes motor 216 and fan/blades/propeller (hereinafter simply "fan") 218.

In some embodiments (not shown), propulsion unit 214 is attached to wings 108. In such embodiments, propulsion unit 214 typically comprises at least two separate units (e.g., one prop attached to each wing, etc.).

In addition to its propulsion function, propulsion unit 214 can serve as a steering/control mechanism. In such embodiments, propulsion unit is able to rotate, pivot, swivel, etc., such as about the long axis of riser 212, and is thereby able to create a thrust in any desired direction.

Each strut 120 is structurally divided into upper section 222 and lower section 224. Upper section 222 of each strut is attached to upper hull 102. Lower section 224 of each strut is attached to a respective lower hull 126. Struts 120 house conduits for electrical power and data cabling, piping for fueling and fuel transfer, and air ducts for channeling intake air from snorkels (not depicted) in upper hull 102 to engines (e.g., diesel engines, etc.) in lower hulls 126. Most of the internal volume of lower section 224 of the struts accommodates fuel tanks and air/water ballast tanks (not depicted). As described further below, a purpose of struts 120 is raise upper hull 102 above the surface of the water.

Lower hulls 126 are displacement hulls; that is, they provide lift or buoyancy for vessel 100. In fact, in some embodiments, when vessel 100 is stationary the lower hulls provide 100 percent of the lift necessary to maintain vessel 100 afloat. In those embodiments, upper hull 102 remains above the water line. In some other embodiments, lower hulls 126 and struts 120 collectively provide all the lift that is required to maintain vessel 100 afloat. In these other embodiments, upper hull 102 remains above the waterline. In yet some additional embodiments, upper hull 102 is in the water when at rest, and, as such, contributes to the overall lift requirement.

To provide the required amount of buoyancy, lower hulls 126 and/or struts 120 contain buoyancy tanks (not depicted). The buoyancy tanks are flooded or deflooded ("blown") to provide a desired amount of buoyancy, in conjunction with pumps or compressed air. Vessel 100 also includes electronics 234 for adjusting ballast as a function of the speed of vessel 100. Typically, ballast is reduced as speed is increased.

Conards 128 are disposed at the forward end and stabilizers 130 are disposed at the aft end of each lower hull 126. The conards and stabilizers are underwater control elements.

Below-the-water propulsion system, indicated generally at identifier 232, is within or otherwise coupled to each lower hull 126. In some embodiments, propulsion system 232 comprises diesel engines (not depicted) driving propellers or water jets, wherein one such engine is disposed in each lower hull 126. In some embodiments, propulsion system 232 also includes a secondary device, such as an electrically-driven propulsor, for slow-speed maneuvering as is required for docking and launching.

As disclosed above, vessel 100 includes both a dynamic-lift-providing element and a static-lift-providing element. In the illustrative embodiment, the dynamic-lift-providing element is wings 108 and the static-lift-providing element is lower hulls 126. Since vessel 100 is capable of generating lift both statically (i.e., by displacement of water) and dynamically, these capabilities can be balanced or traded off against one another to suit the specifics of a particular application.

As previously disclosed, in the illustrative embodiment, when vessel 100 is stationary in the water (i.e., has no relative forward speed), all lift is generated by lower hulls 126. In the illustrative embodiment, struts 120 are sized to raise upper hull 102 above the water line even when vessel 100 is stationary. In some alternative embodiments, additional buoyancy is provided by struts 120, and in some further embodiments buoyancy is provided by upper hull 102 when vessel 100 is stationary. Once vessel 100 is underway, lift is generated by wings 108. The lift generated by the wings reduces the lift requirement of lower hulls 126. To account for the decreased lift required by the lower hulls, ballast is adjusted (i.e., buoyancy tanks are at least partially flooded).

When vessel 100 is intended to be used in relatively rougher waters, it can be designed to sacrifice some speed for enhanced stability. This is done by appropriately apportioning lift between static-lift and dynamic lift. Directionally, increasing the amount of static lift (enlarging lower hulls 126) and decreasing the amount of dynamic lift (reducing the size of wings 108) will result in a relative increase in stability and a decrease in speed. Furthermore, for use in relatively rougher waters—larger waves—a relatively longer strut 120 is used. This result in a greater distance between lower hulls 126 and upper hull 102.

When vessel 100 is intended be used in relatively calmer waters, SWATH-type (i.e., stability enhancing) characteristics can be de-emphasized while WIG-type (i.e., speed enhancing) characteristics are emphasized. Directionally, decreasing the amount of static lift (reducing the displacement of lower hulls 126) and increasing the amount of dynamic lift (increasing the size of wings 108) will result in a relative decrease in stability and an increase in speed. And, to the extent the water will be calm (i.e., low sea state), a relatively shorter strut 120 can used. That is, since a lower maximum wave height must be accommodated, the distance between the surface of the water and the bottom of upper hull 102 can be reduced (relative to the required height in higher sea states).

Furthermore, the ability of vessel 100 to trade off static and dynamic lift can be used to accommodate variations in payload capacity.

It will be understood that the size of lower hulls 126 cannot be reduced below a minimum size, which is required, and at least in some embodiments, to keep upper hull 102 above the water line when vessel 100 is stationary in the water. As previously disclosed, buoyancy is decreased by adjusting ballast.

The design of SWATH craft and WIG craft are known to those skilled in the art. Those skilled in the art are, therefore, capable of calculating the required lift for either type of vessel and are capable of designing lower hulls to satisfy the static-lift requirement for a SWATH craft and wings to satisfy the dynamic-lift requirement for a WIG craft. As such, after reading this specification, those skilled in the art will be capable of apportioning the total lift requirement between static and dynamic as a function of intended service and will be able to design and build vessel 100, including a static-lift-providing element and a dynamic-lift-providing element based on the apportionment.

It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Furthermore, it is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

I claim:

1. A vessel for use in water, wherein said vessel comprises:
    an upper hull, wherein said upper hull is supported above the water;
    a dynamic-lift-providing element, wherein said dynamic-lift-providing element is operatively coupled to said upper hull, wherein said dynamic-lift-providing element provides lift when said vessel is in motion; and
    a static-lift-providing element, wherein said static-lift-providing element is operatively coupled to said upper hull, and wherein:
        when said vessel is stationary, said static-lift-providing element provides all lift required to maintain said upper hull above the water; and
        when said vessel is not stationary, said static-lift-providing element remains submerged and provides at least some portion of the lift required to maintain said upper hull above the water.

2. The vessel of claim 1 further comprising a strut, wherein said strut physically couples said static-lift-providing element to said upper hull.

3. The vessel of claim 1 further comprising:
    a ballast tank for providing a desired amount of buoyancy for said vessel; and
    electronics for adjusting said buoyancy provided by said ballast tank.

4. The vessel of claim 3 wherein said electronics adjust buoyancy as a function of the amount of lift that is provided by said dynamic-lift-providing element.

5. The vessel of claim 3, further comprising a first propulsion source and a second propulsion source, wherein said first propulsion source is disposed above the water and said second propulsion source is submerged in the water wherein said electronics adjust buoyancy as a function of vessel speed.

6. A vessel for use in water, wherein said vessel comprises:
    an upper hull;
    a wing, wherein said wing is coupled to said upper hull and remains above the water;
    at least one lower hull, wherein said one lower hull is coupled to said upper hull, and wherein said lower hull remains submerged when said vessel is underway;
    a ballast tank;
    electronics for adjusting ballast of said ballast tank to apportion lift between static lift and dynamic lift; and
    a first propulsion system, wherein said first propulsion system is physically coupled to said lower hull.

7. The vessel of claim 6 further comprising a second propulsion system, wherein said second propulsion system is disposed above the water.

8. The vessel of claim 7 wherein said second propulsion system provides a control/steering function in addition to a propulsion function.

9. The vessel of claim 6 wherein said ballast tank is disposed in said lower hull and when said vessel has no relative motion in the water, the buoyancy of said lower hull provides substantially all of the lift required to maintain said upper hull above the water.

10. The vessel of claim 6 wherein, when said vessel has no relative motion in the water, the buoyancy of said lower hull provides some, but not all of the lift required to maintain said upper hull above the water.

11. The vessel of claim 6 wherein, when said vessel has no relative motion in the water, at least a portion of said upper hull is in the water.

12. The vessel of claim 6 wherein, when said vessel is under way, said wing provides some, but not all, of the lift for said vessel.

13. The vessel of claim 6 further comprising at least one strut, wherein said strut couples said at least one lower hull to said upper hull, and said strut has a length that is sufficient to support said upper hull a distance above the water.

14. A vessel for use in water, wherein said vessel comprises:
    a SWATH hull form having:
        a first lower hull and a second lower hull;
        a first strut and a second strut; and
        an upper hull, wherein:
            said first strut couples said first lower hull to said upper hull;
            said second strut couples said second lower hull to said upper hull;
            said first lower hull and said second lower hull remain at least partially submerged at all times;
    a wing, wherein said wing is coupled to said upper hull and remains above the water;
    a ballast tank and electronics for adjusting ballast wherein said electronics are operable to change the depth of said first lower hull and said second lower hull independently of dynamic lift provided by said wing.

15. A method for use in conjunction with a sea-faring vessel, the method comprising:
    employing a combination of static lift and dynamic lift to maintain said vessel afloat when it is underway;
    maintaining, in a submerged condition, an element that provides substantially all static lift for said vessel; and
    adjusting ballast while said vessel is underway to change the depth of said element independently of said dynamic lift.

* * * * *